United States Patent [19]

Pelrine

[11] Patent Number: 5,392,715
[45] Date of Patent: Feb. 28, 1995

[54] IN-PIPE RUNNING ROBOT AND METHOD OF RUNNING THE ROBOT

[75] Inventor: Ronald E. Pelrine, Menlo Park, Calif.

[73] Assignee: Osaka Gas Company, Ltd., Osaka, Japan

[21] Appl. No.: 135,015

[22] Filed: Oct. 12, 1993

[51] Int. Cl.⁶ .............................................. B61B 13/00
[52] U.S. Cl. .................................................. 104/138.2
[58] Field of Search ............... 104/138.2; 105/73, 78; 378/60; 346/33 P

[56] References Cited

U.S. PATENT DOCUMENTS

| | | | |
|---|---|---|---|
| 2,596,322 | 5/1952 | Zumwalt | 105/78 |
| 3,547,040 | 12/1970 | Baran | 104/138.2 |
| 3,718,978 | 3/1973 | Van Koevering et al. | 104/138.2 |
| 3,872,940 | 3/1975 | Gambini | 104/138.2 |
| 4,677,865 | 7/1987 | Lehmann | 104/138.2 |
| 5,284,096 | 2/1994 | Pelrine et al. | 105/78 |

FOREIGN PATENT DOCUMENTS

0162152  6/1990  Japan .................. 104/138.2
3262769 11/1991  Japan .................. 104/138.2

*Primary Examiner*—Mark T. Le
*Attorney, Agent, or Firm*—Webb Ziesenheim Bruening Logsdon Orkin & Hanson

[57] ABSTRACT

An in-pipe running robot includes a vehicle body movable inside piping along a piping axis, and a pair of running devices disposed in front and rear positions of the vehicle body. Each of the running devices has a pair of wheels secured to opposite ends of an axle. The wheels are steerable as a unit about a vertical axis of the vehicle body, and have a center of steering thereof extending linearly in a fore and aft direction of the vehicle body. When the robot is caused to run in a circumferential direction inside the piping, the vehicle body is set to a posture having the fore and aft direction inclined with respect to the piping axis, with the running devices set to a posture for running in the circumferential direction. Then, the running devices are driven to cause the vehicle body to run stably in the circumferential direction of the piping.

8 Claims, 6 Drawing Sheets

IN-PIPE RUNNING ROBOT AND METHOD OF RUNNING THE ROBOT

BACKGROUND OF THE INVENTION

1. FIELD OF THE INVENTION

This invention relates to in-pipe running robots, and more particularly to an in-pipe running robot for use in various operations inside piping such as inspection of interior conditions or repair of inner walls of piping. The invention relates also to a method of running such a robot.

2. DESCRIPTION OF THE RELATED ART

In order to inspect and repair piping interiors, such an in-pipe running robot is required to run straight along a piping axis, and to run round circumferentially in the piping while adhering to an inner wall and maintaining a fixed position axially of the piping.

The robot runs straight along the piping axis, for example, to arrive at an intended location quickly or to inspect piping bottoms successively which, generally, are the most susceptible part of the piping. Where the piping includes a welded joint formed circumferentially thereof, for example, the robot is required to run circumferentially in the piping to inspect or repair the joint as necessary.

This type of in-pipe running robot has adherent wheels to be able to run while adhering to running surfaces in vertically extending piping as well, for example.

Figure 6A:
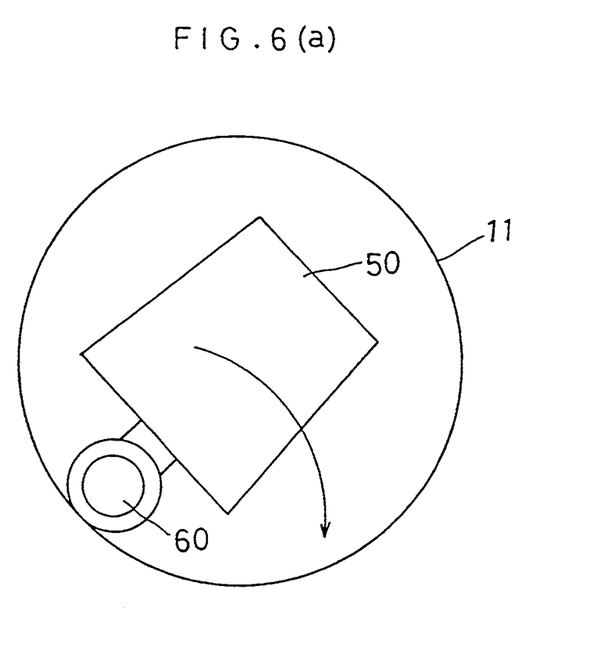

FIG. 6 (a) shows a running state of a conventional in-pipe running robot. This in-pipe running robot includes a vehicle body movable inside piping along a piping axis, and a pair of front and rear running devices attached to the vehicle body. Each running device includes a pair of wheels mounted on opposite end regions of an axle, and is steerable about a vertical axis of the vehicle body. The center of steering extends linearly in a fore and aft direction of the vehicle body. The robot further includes drive control devices for individually driving the pair of running devices, and steering control devices for individually steering the running devices.

Figure 3:
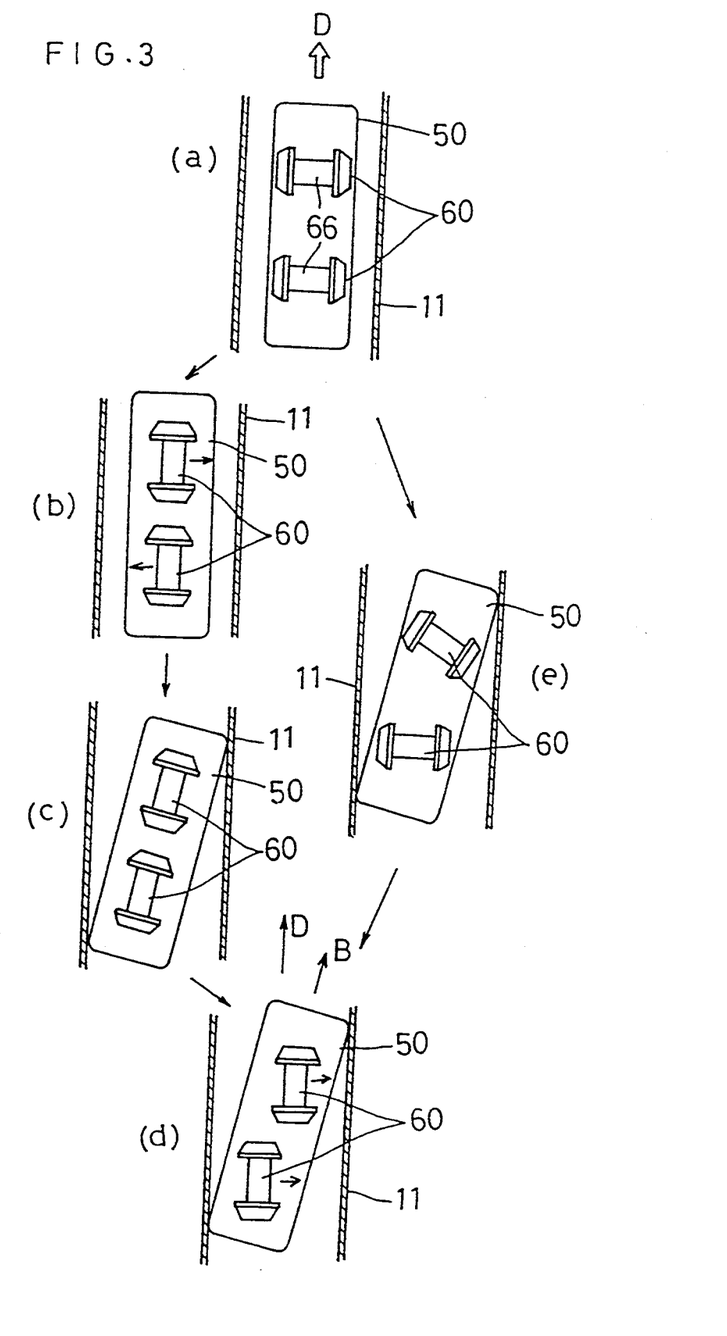
FIG. 3 includes parts (a) through (e) showing a process of switching the robot from a straight running posture to a circular running posture.

When the robot is required to run straight along the piping axis, the vehicle body and running devices are placed in the posture shown in FIG. 3 (a) (with the fore and aft direction of the vehicle body extending parallel to the piping axis, and the axles of the running devices extending at right angles to the piping axis). When the robot is required to run round the piping axis, the vehicle body and running devices are placed in the posture shown in FIGS. 3 (b) and 6 (a) (with the fore and aft direction of the vehicle body extending parallel to the piping axis, and the axles of the running devices aligned to each other and extending parallel to the piping axis).

Conventionally, the in-pipe running robot is intended to maintain a fixed position axially of the piping in running round circumferentially in the piping. However, as shown in FIG. 6 (a), the robot would turn over by gravity when the robot becomes tilted to a certain degree.

It is therefore necessary with the robot having the above construction to rely on the adhering ability of the running devices for an appropriate selection of the center of gravity of the robot, or to limit a load capacity of the robot. This presents restrictive conditions in designing of the robot, which are undesirable.

SUMMARY OF THE INVENTION

An object of the present invention, therefore, is to provide an in-pipe running robot which does not easily turn over even when running round circumferentially inside piping, and a method of running the robot which allows the robot to run stably circumferentially inside piping. The above object is fulfilled, according to the present invention, by an in-pipe running robot comprising:

a vehicle body movable inside piping along a piping axis;

a pair of running devices disposed in front and rear positions of the vehicle body, each of the running devices including a pair of wheels secured to opposite ends of an axle, the running devices being steerable as a unit about a vertical axis of the vehicle body and having a center of steering thereof extending linearly in a fore and aft direction of the vehicle body;

drive control means for individually driving the pair of running devices;

steering control means for individually steering the pair of running devices with respect to the fore and aft direction of the vehicle body;

first detecting means for detecting angular displacement of the fore and aft direction of the vehicle body with respect to the piping axis;

second detecting means for detecting steering amounts of each of the running devices with respect to the fore and aft direction of the vehicle body; and running posture control means for controlling the drive control means and the steering control means in response to results of detection by the first detecting means and the second detecting means, to place the vehicle body in a position for running in a circumferential direction of the piping, with the fore and aft direction of the vehicle body inclined with respect to the piping axis, and the running devices set to run in the circumferential direction.

In a further aspect of the invention, a method of running an in-pipe running robot through piping is provided, the robot having a vehicle body movable inside piping along a piping axis, and a pair of running devices disposed in front and rear positions of the vehicle body, each of the running devices including a pair of wheels secured to opposite ends of an axle, the wheels being steerable as a unit about a vertical axis of the vehicle body and having a center of steering thereof extending linearly in a fore and aft direction of the vehicle body, the method comprising the steps of:

setting the vehicle body to a posture having the fore and aft direction inclined with respect to the piping axis;

setting the running devices to a posture for running in a circumferential direction of the piping; and driving the running devices to cause the vehicle body to run in the circumferential direction of the piping.

The present invention provides the following functions and effects.

Figure 6B:
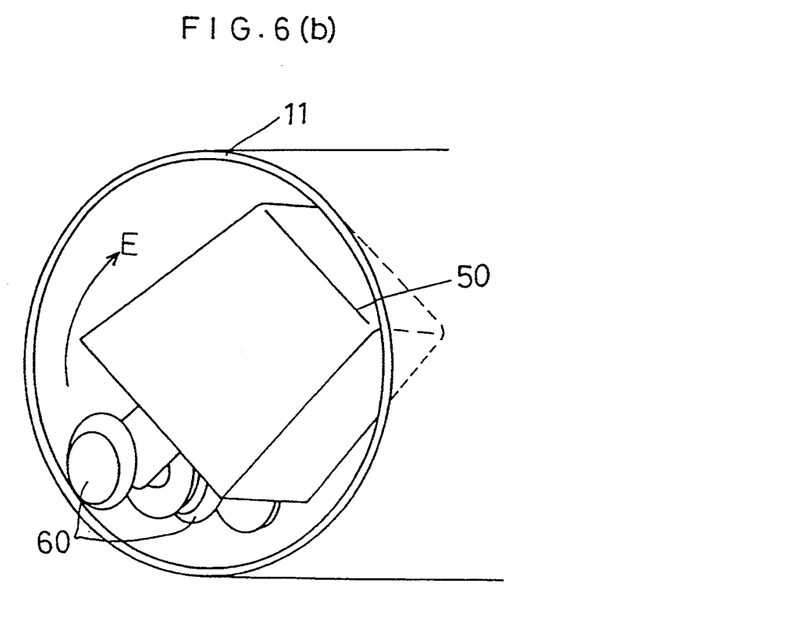

The in-pipe running robot has a pair of running devices disposed in front and rear positions of the vehicle body, and the running devices are driven and steered individually under control of the drive control means and steering control means. The first detecting means detects a posture of the vehicle body with respect to the piping axis, while the second detecting means detects a steering amount of each running device. When changing the robot from a straight running posture for running along the piping axis to a circular running posture for running circumferentially of the piping, the running posture control means causes the drive control means and steering control means to place the vehicle body having the fore and aft direction thereof inclined with respect to the piping axis, with the running devices set to run in the circumferential direction of the piping (the posture shown in FIGS. 3 (d) and 4). In this state, the robot runs circumferentially of the piping. In this posture, as also shown in FIG. 6 (b), a direction (referenced B in FIG. 4) extending through centers of steering of the two running devices is displaced from the direction of the axles of the running devices. Consequently, the running devices are arranged to have a transverse width when seen from the front of the robot, whereby the robot runs in the circumferential direction of the piping without overturning.

In the method of running the in-pipe running robot according to the present invention, the robot stably runs in the above-noted posture circumferentially of the piping.

Thus, the present invention provides an in-pipe running robot having a unique construction and a method of running the robot, which assure stable running along the piping axis and in the circumferential direction of the piping.

When the vehicle body is in a straight running posture for running along the piping axis, the fore and aft direction of the vehicle body extends along the piping axis, and the turning devices are directed to run along the piping axis. The running posture control means is operable for switching the vehicle body from the straight running posture to a circular running posture to run in the circumferential direction through the steps set out hereunder. The robot having arrived at a predetermined location axially of the piping is allowed to run circumferentially of the piping while substantially maintaining the location axially of the piping.

Step 1

Operate the steering control means to turn the axles of the running devices to extend along the piping axis while maintaining the fore and aft direction of the vehicle body parallel to the piping axis;

Step 2 operate the drive control means to drive the running devices in opposite directions to displace the vehicle body to an inclined posture relative to the piping axis; and Step 3 operate the steering control means to turn the axles of the running devices to extend along the piping axis.

Alternatively, the running posture control means may switch the vehicle body from the straight running posture to a circular running posture to run in the circumferential direction through the following steps, thereby to effect posture switching relatively quickly:

Step 1 operate the steering control means and the drive control means at the same time to incline the fore and aft direction of the vehicle body with respect to the piping axis; and Step 2 operate the steering control means to turn the axles of the running devices to extend along the piping axis.

Further, the pair of wheels of each running device may have different polarities, so that each running device adheres to the piping walls through a magnetic field formed between the wheels. Then, the in-pipe running robot can stably run straight or circumferentially, with the running devices adhering to piping walls through a strong magnetic attraction.

The foregoing and other objects, features and advantages of the invention will be apparent from the following more particular description of preferred embodiments of the invention, as illustrated in the accompanying drawings.

BRIEF DESCRIPTION OF THE DRAWINGS

FIGS. 5 (a)–5 (b) are views showing conditions of the in-pipe running robot passing through an elbow section and a sleeve section; and FIGS. 6 (a) and (b) are views showing conditions of a conventional in-pipe running robot and of the robot according to the present invention running circumferentially in piping, respectively.

DETAILED DESCRIPTION OF THE PREFERRED EMBODIMENTS

An in-pipe running robot according to the present invention will be described in detail with reference to the drawings.

Figure 1:
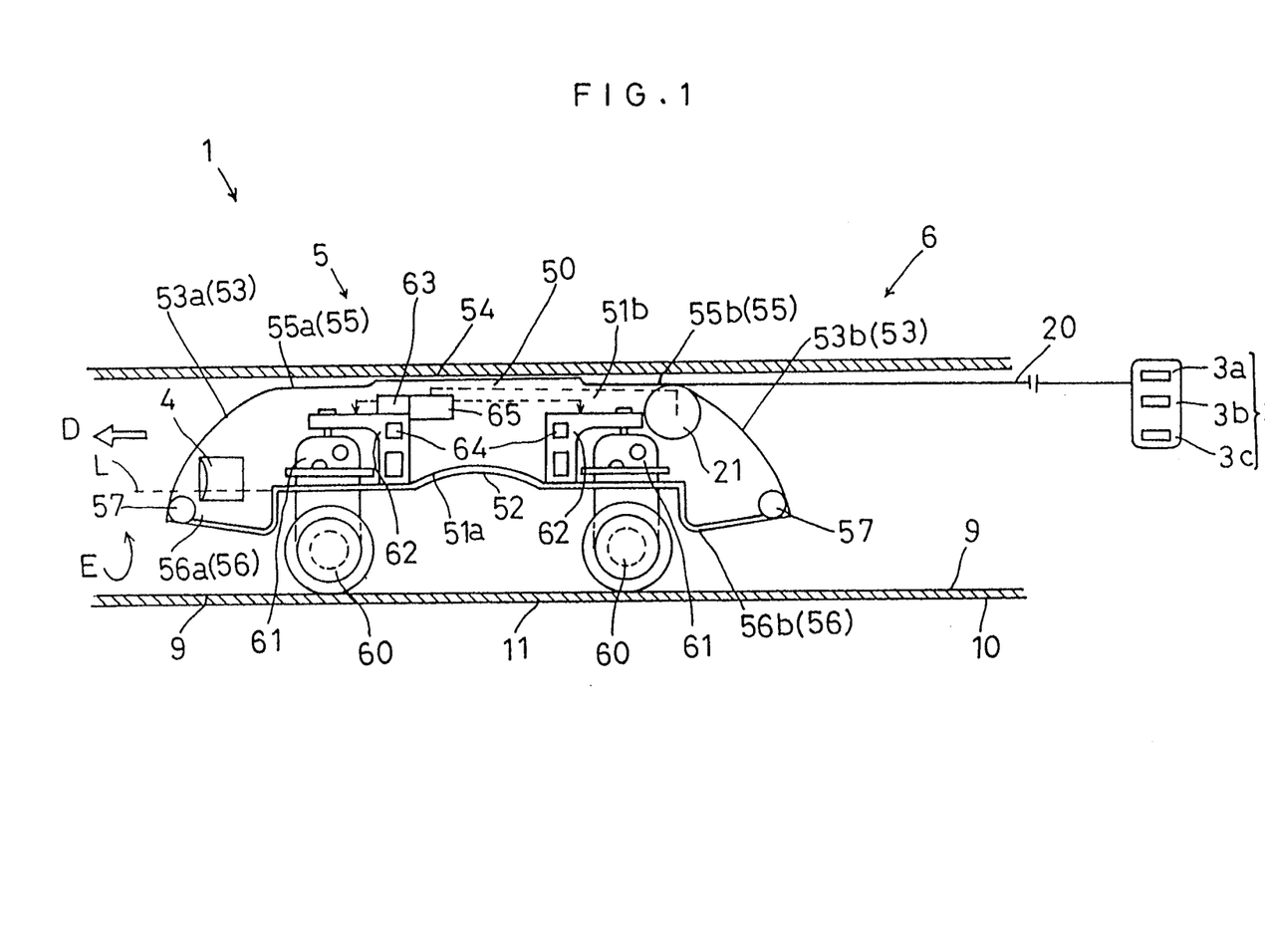
FIG. 1 is a side view of an in-pipe running robot according to the present invention.
Figure 2:
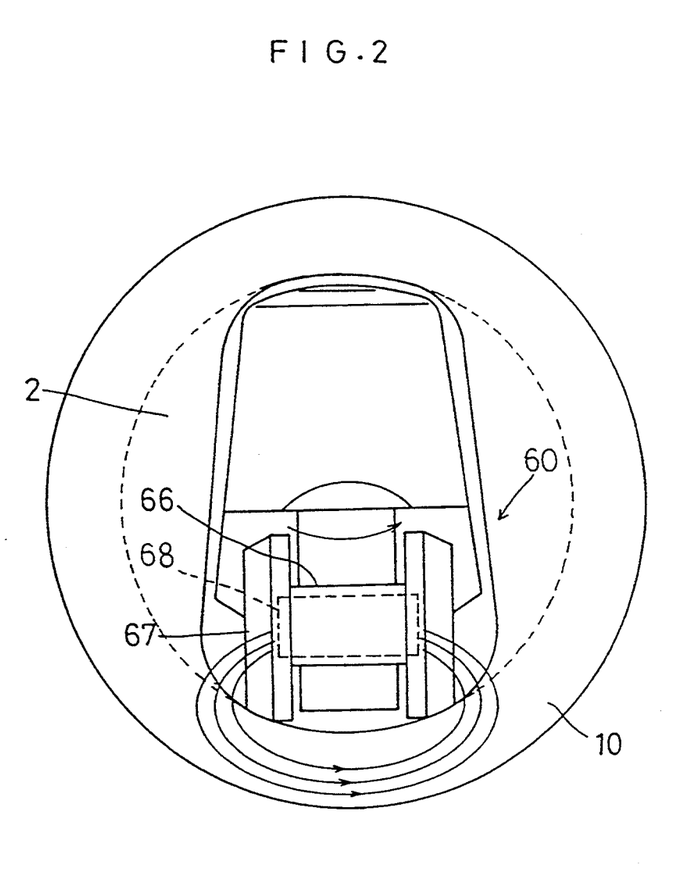
FIG. 2 is a front view of the in-pipe running robot passing through a valve section of piping.

FIG. 1 shows a side view of a robot 1 running inside piping 11. FIG. 2 shows a front view of the robot 1 running through a valve section 2.

As shown in FIG. 1, the in-pipe running robot 1 is operable under control of and upon command information received from a system 3 disposed outside the piping 11. This system 3 includes a command unit 3a for giving running instructions, operating instructions and the like, a display unit 3b for displaying image information received from an image pickup 4 mounted on the robot 1, and a data processing unit 3c.

The robot 1 has a main body 5 of rectangular shape, in plan view, elongated axially of the piping 11 as shown in FIG. 3, part (a). The main body 5 includes a vehicle body 50 having a characteristic configuration in side view as shown in FIG. 1, and a pair of running devices 60 arranged under the vehicle body 50. The vehicle body 50 includes a body frame 51a supported on the running devices 60 and having a plate-like upper surface, and a plastic cover 51b enclosing various devices mounted on the body frame 51a as described later.

Figure 5A:
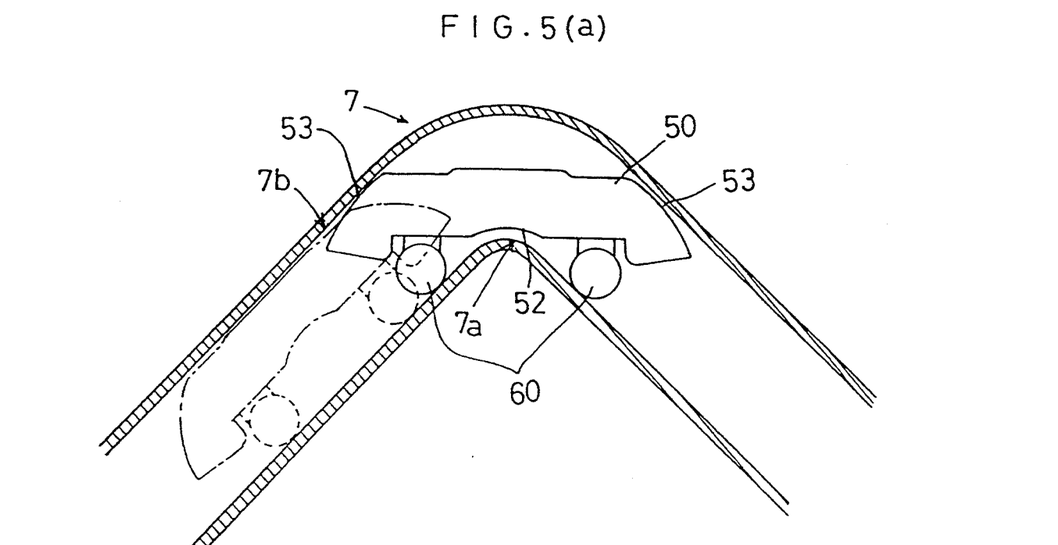
Figure 5B:
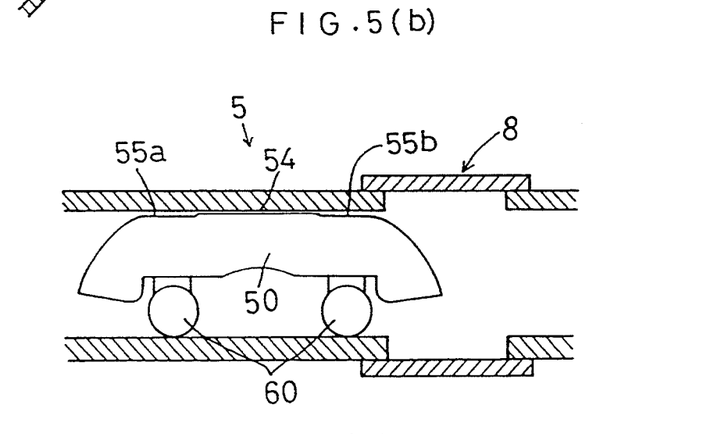
Figure 5C:
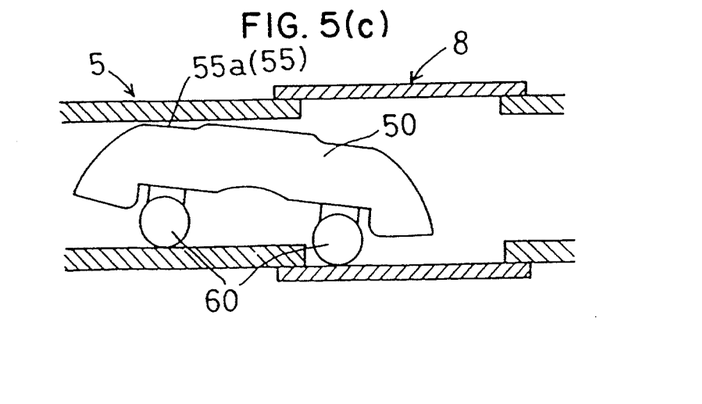

The body frame 51a includes an upward recess 52 formed in a middle position longitudinally thereof between the pair of running devices 60. The recess 52 is formed to avoid interference with an inner wall 7a of an elbow section 7 when the in-pipe running robot passes therethrough as shown in solid lines in FIG. 5 (a). Further, the vehicle body 50 includes upper end regions 53 defining a curved (arcuate) front surface 53a and a curved (arcuate) rear surface 53b, respectively, in the fore and aft direction of the robot 1. The curved upper end regions 53 are shaped to avoid interference with opposite inner walls 7b across the elbow section 7 when the robot 1 is in the elbow section 7 as shown in the solid lines in FIG. 5 (a).

The vehicle body 50 further includes stepped front and rear regions 55a and 55b continuous with the curved front surface 53a and curved rear surface 53b, respectively, and at a lower level than top portion 54 of the robot 1. These stepped regions are included to minimize the cross sectional area perpendicular to the long axis of the body 50 in the regions above the wheels 60. Minimizing cross sectional area while retaining a usable volume in the robot is important for applications in high flow pipes such as natural gas pipes.

The body frame 51a includes stepped lower front and rear end regions 56a and 56b which are closer than a standard level L of the body frame 51a to running plane 9. These lower regions 56a and 56b provide increased accommodating space in the robot 1.

FIG. 5 (a) shows, in dot-and-dash lines, a positional relationship between the main body 5 and the piping resulting from a further advance of the robot 1.

The body frame 51a includes rollers 57 mounted on front and rear and right and left corners thereof (see FIG. 4) to contact inner walls 10 of the piping and guide the vehicle body 50 when the robot 1 takes a posture for running circumferentially in the piping.

This vehicle body 50 has a trapezoidal shape in front view as seen from FIG. 2, to facilitate passage through a valve section 2 or the like.

The various devices mounted on the vehicle body 50 will be described next.

The image pickup 4 mentioned hereinbefore is mounted in the stepped lower front region 56a on the body frame 51a. The image pickup 4 comprises a laser scanner used in observation and inspection of the piping interior ahead of the robot 1. The vehicle body 50 includes drive control devices 61 for individually driving the running devices 60, and steering control devices 62 for individually steering the running devices 60 with respect to the fore and aft direction of the vehicle body 50. The vehicle body 50 further includes a first detecting device 63 for detecting displacement of the vehicle body 50 from a position parallel to an axial direction D of the piping through which the robot 1 is running. The first detecting device 63 may comprise proximity sensors or range finders, such as eddy current proximity sensors or ultrasonic range finders, for determining the distance from both sides of the body 50 to the piping 11. By knowing the distance to the piping 11 on both sides of the body 50, angle of the body relative to the pipe axis can be determined. Alternately, image pickup 4 can be used to visually estimate the body angle relative to the pipe. In this embodiment first detecting device 63 and image pickup 4 are the same device. The estimation can be done by a human operator from the visual image or by an automatic machine vision program. The vehicle body 50 also includes second detecting devices 64 for detecting steering amounts of the running devices 60 with respect to the fore and aft direction of the vehicle body 50. The second detecting devices 64 can be optical encoders or one of the other rotation detecting devices known in the prior an of rotation sensing.

Thus, the running devices 60 may be driven and steered individually. A running posture control device 65 is provided to operate the drive control devices 61 and steering control devices 62 in response to results of detection by the first and second detecting devices 63 and 64. Based on the results of detection by the first and second detecting devices 63 and 64, the running posture control device 65 controls steering and running amounts of the respective running devices 60 through the drive control devices 61 and steering control devices 62, to place the robot 1 (vehicle body 50) in a position for running in a circumferential direction E of the piping. In this position, the fore and aft direction of the vehicle body 50 is inclined with respect to the piping axis D, and the respective running devices 60 are set to run in the circumferential direction E.

This control usually is started when the robot 1 (vehicle body 50) is in a straight running posture for running along the piping axis D, with the fore and aft direction of the vehicle body 50 extending along the piping axis D, and the running devices 60 directed to run along the piping axis D.

The control for switching from the straight running posture to the circumferential or circular running posture is effected through the following steps (see FIGS. 3, parts (a)–(d)):

First Step

Operate the steering control devices 62 to turn axles 66 of the respective running devices 60 to extend along the piping axis D while maintaining the fore and aft direction of the vehicle body 50 parallel to the piping axis D;

Second Step

Operate the drive control devices 61 to drive the running devices 60 in opposite directions to displace the vehicle body 50 to an inclined posture relative to the piping axis D; and Third Step Operate the steering control devices 62 to turn the axles 66 of the respective running devices 60 to extend along the piping axis D.

The above steps are executed in the reversed order when switching from the circular running posture to the straight running posture.

The construction of the running devices 60 employed in the in-pipe running robot 1 will be described next with reference to FIG. 2.

As noted hereinbefore, these running devices 60 are provided in a pair arranged in the fore and aft direction of the vehicle body 50. Each running device 60 includes a pair of wheels 67 secured to opposite ends of the axle 66, and is steerable as an integral unit about a vertical axis of the vehicle body 50. The centers of steering are parallel arranged in the fore and aft direction of the vehicle body 50.

As shown in FIG. 2, each running device 60 further includes a magnet 68 mounted in the axle 66. The pair of wheels 67 disposed at the opposite ends of the axle 66 are different in polarity. This produces a magnetic field in a piping wall 10 between the wheels 67 to secure a strong magnetic attraction. As a result, the robot 1 runs while adhering to the piping wall 10.

Devices used in data communication between the in-pipe running robot 1 and the system 3 disposed outside the piping will be described next. As shown in FIG. 1, the vehicle body 50 includes a reel 21 mounted on an upper rear position thereof to hold a predetermined amount of information transmitting optical fiber 20. This reel 21 unwinds the optical fiber 20 as the robot 1 runs forward along the piping axis D, and takes up the optical fiber 20 as the, robot 1 runs backward. Thus, running of the robot 1 through the piping does not apply any significant tension to or drag the optical fiber 20.

The foregoing is the construction of the in-pipe running robot 1 according to the present invention.

The straight running and circular running of the robot 1 will be described hereinafter with reference to FIG. 3.

When the robot 1 (vehicle body 50) runs straight through the piping, the fore and aft direction of the vehicle body 50 is set parallel to the piping axis D, with the respective running devices 60 running along the piping axis D (FIG. 3, part (a)). In this state, the in-pipe running robot 1 (vehicle body 50) is in the straight running posture. Since the running devices 60 are steerable, the robot 1 may be placed in selected postures in the piping 11.

In a state for circumferential running, the fore and aft direction of the vehicle body 50 is inclined with respect to the piping axis D, and the respective running devices 60 are set to run in the circumferential direction (FIG. 3, part (d)). In this state, the robot 1 is in the circular running posture. In this posture, the axles 66 of the running devices 60 arranged in front and rear positions of the robot 1 are out of alignment as distinct from the posture shown in FIG. 3, part (b), to avoid overturning of the robot 1 (see also FIG. 6 (b) showing a front view of this state). The vehicle body 50 in this posture is reliably guided by the guide rollers 57 contacting the pipe walls 10.

The running posture control device 65 is operable to change the robot 1 from the straight running posture to the circular running posture.( FIG. 3, parts (a) through (d) show a sequence of the steps taken for this change, as follows:

First Step

Operate the steering control devices 62 to turn axles 66 of the respective running devices 60 to extend along the piping axis D while maintaining the fore and aft direction of the vehicle body 50 parallel to the piping axis D (FIG. 3, part (b));

Second Step

Operate the drive control devices 61 to drive the running devices 60 in opposite directions to displace the vehicle body 50 to an inclined posture relative to the piping axis D (FIG. 3, part (c)); and Third Step Operate the steering control devices 62 to turn the axles 66 of the respective running devices 60 to extend along the piping axis D (FIG. 3, part (d)).

After these steps, the running devices 60 are driven to run the robot 1 circumferentially of the piping 11.

The above steps are executed in the reversed order when switching from the circular running posture to the straight running posture.

Figure 4:
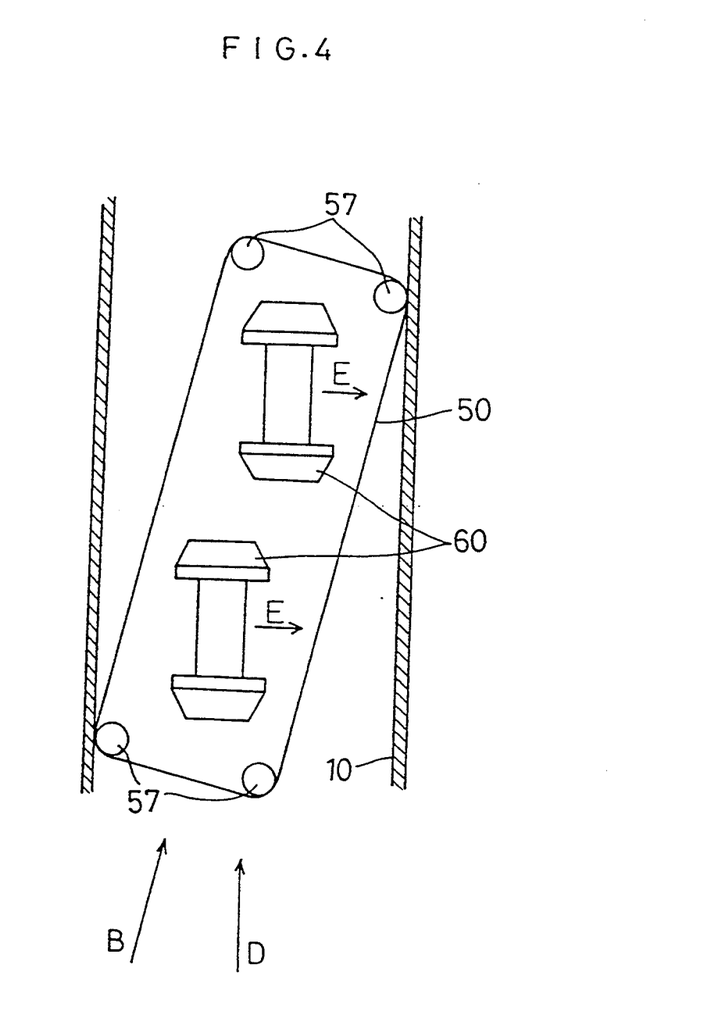
FIG. 4 is a plan view of a vehicle body in the circular running posture.

In the circular running posture, as also shown in FIG. 4, two diagonally opposite corners of the vehicle body 50 may contact piping walls, depending on a pipe diameter. Consequently, the rollers 57 acting as guide members contact the pipe walls and positively guide the vehicle body 50. The rollers 57 may comprise a sphere captured within a socket of more than 180°, similar to the rollers used in ball point pens and ball joints.

Other embodiments of the invention will be described hereinafter.

(a) In the foregoing embodiment, each running device includes a single magnet mounted in the axle, and a pair of wheels different in polarity, to have a magnetically attracting function. The running devices may have any construction as long as they are capable of running while adhering to piping walls. For example, where the piping contains a liquid having a relatively high viscosity, the vehicle body may adhere to piping walls by suction of the liquid. The vehicle body may adhere to running surfaces simply by friction.

(b) The running posture control device may operate to switch the robot from the straight running posture to the circular running posture through the following steps:

Step 1

Operate the steering control devices and drive control devices at the same time to incline the fore and aft direction of the vehicle body with respect to the piping axis D (FIG. 3, part (e)); and Step 2

Operate the steering control devices to turn the axles of the respective running devices to extend along the piping axis (FIG. 3, part (d)), (c) The foregoing embodiment has been described in which the in-pipe running robot is caused to run in the straight running posture axially of the piping, or in the circular running posture circumferentially of the piping. When running the robot helically along the piping, the fore and aft direction of the vehicle body may be set to an inclined posture with respect to the piping axis, with the axles of the running devices simultaneously set to a selected angle to the piping axis. Then, the robot may run helically with little possibility of overturning.

(d) In the foregoing embodiment, the running posture control device is mounted on the main body of the robot. However, this control device may be incorporated into a command device disposed outside the piping.

(e) In the foregoing embodiment, circular running of the robot has been described as making a complete circle on an inner wall of the piping. However, the robot may run describing part of a circle adjacent the piping bottom. In this case, the robot can secure a sliding contact state between the vehicle body and piping wall simply by friction.

(f) In the described embodiment, the rollers have been exemplified as the guide members provided on the corners of the vehicle body. Instead, these corners may be made smoothly slidable such as by Teflon-processing.

What is claimed is:

1. An in-pipe running robot comprising:
a vehicle body movable inside piping along a piping axis;
a pair of running devices disposed in front and rear positions of said vehicle body, each of said running devices including a pair of wheels secured to opposite ends of an axle, with each of said running devices being steerable as a unit about a vertical axis of said vehicle body with centers of steering of said running devices disposed substantially parallel to a fore and aft direction of said vehicle body;
drive control means for individually driving said pair of running devices;
steering control means for individually steering said pair of running devices with respect to said fore and aft direction of said vehicle body;

first detecting means for detecting angular displacement of said fore and aft direction of said vehicle body with respect to said piping axis;

second detecting means for detecting steering amounts of each of said running devices with respect to said fore and aft direction of said vehicle body; and running posture control means for controlling said drive control means and said steering control means in response to results of detection by said first detecting means and said second detecting means, to place said vehicle body in a position for running in a circumferential direction of said piping, with said fore and aft direction of said vehicle body inclined with respect to said piping axis, and said running devices set to run in said circumferential direction.

2. An in-pipe running robot as defined in claim 1, wherein, when said vehicle body is in a straight running posture for running along said piping axis, said fore and aft direction of the vehicle body extends along said piping axis, and said running devices are directed to run along said piping axis, said running posture control means being operable for switching said vehicle body from the straight running posture to a circular running posture to run in said circumferential direction through the following steps:

a first step of operating said steering control means to turn the axles of said running devices to extend along said piping axis while maintaining said fore and aft direction of said vehicle body parallel to said piping axis;

a second step of operating said drive control means to drive said running devices in opposite directions to displace said vehicle body to an inclined posture relative to said piping axis; and a third step of operating said steering control means to turn said axles of said running devices to extend along said piping axis.

3. An in-pipe running robot as defined in claim 1, wherein, when said vehicle body is in a straight running posture for running along said piping axis, said fore and aft direction of the vehicle body extends along said piping axis, and said running devices are directed to run along said piping axis, said running posture control means being operable for switching said vehicle body from the straight running posture to a circular running posture to run in said circumferential direction through the following steps:

a first step of operating said steering control means and said drive control means at the same time to incline said fore and aft direction of said vehicle body with respect to said piping axis; and a second step of operating said steering control means to turn the axles of said running devices to extend along said piping axis.

4. An in-pipe running robot as defined in claim 1, wherein said vehicle body includes guide members mounted on corners thereof to contact inner walls of said piping and guide said vehicle body when said vehicle body takes said circular running posture.

5. An in-pipe running robot as defined in claim 1, wherein said running devices are constructed to adhere to piping walls by magnetic attraction.

6. An in-pipe running robot as defined in claim 5, wherein said pair of wheels of each of said running devices have different polarities, each of said running devices adhering to said piping walls through a magnetic field formed between said wheels.

7. A method of running an in-pipe running robot through piping, said robot having a vehicle body movable inside piping along a piping axis, and a pair of running devices disposed in front and rear positions of said vehicle body, each of said running devices including a pair of wheels secured to opposite ends of an axle, with each of said running devices being steerable as a unit about a vertical axis of said vehicle body with centers of steering of said running devices disposed substantially parallel to a fore and aft direction of said vehicle body, said method comprising the steps of:

setting said vehicle body to a posture having said fore and aft direction inclined with respect to said piping axis;

setting said running devices to a posture for running in a circumferential direction of said piping; and driving said running devices to cause said vehicle body to run in said circumferential direction of said piping.

8. A method as defined in claim 7, wherein said robot is caused to run inside said piping, with each of said running devices adhering to piping walls through a magnetic field formed between said pair of wheels which have different polarities.

* * * * *